Patented June 25, 1929.

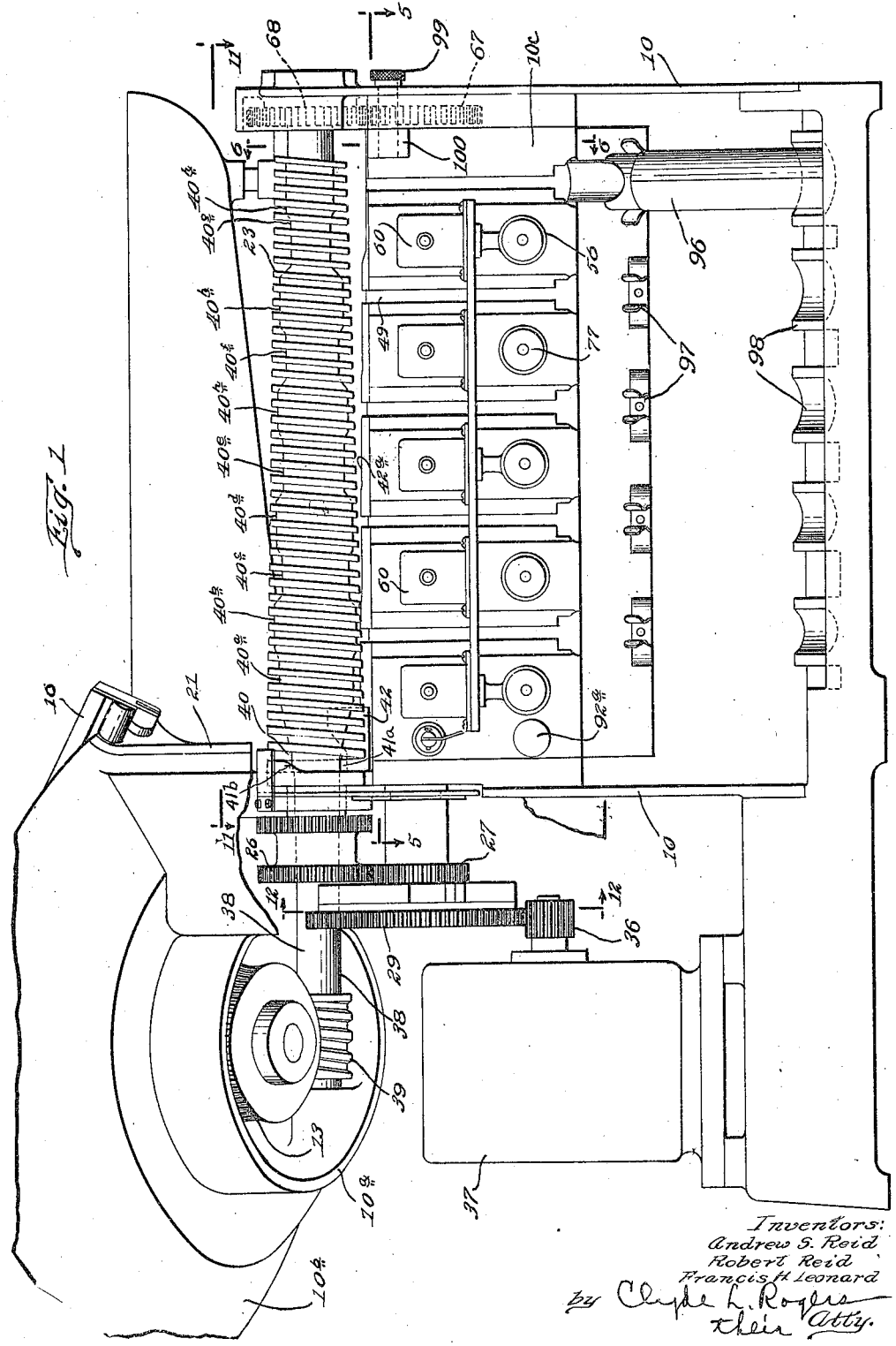

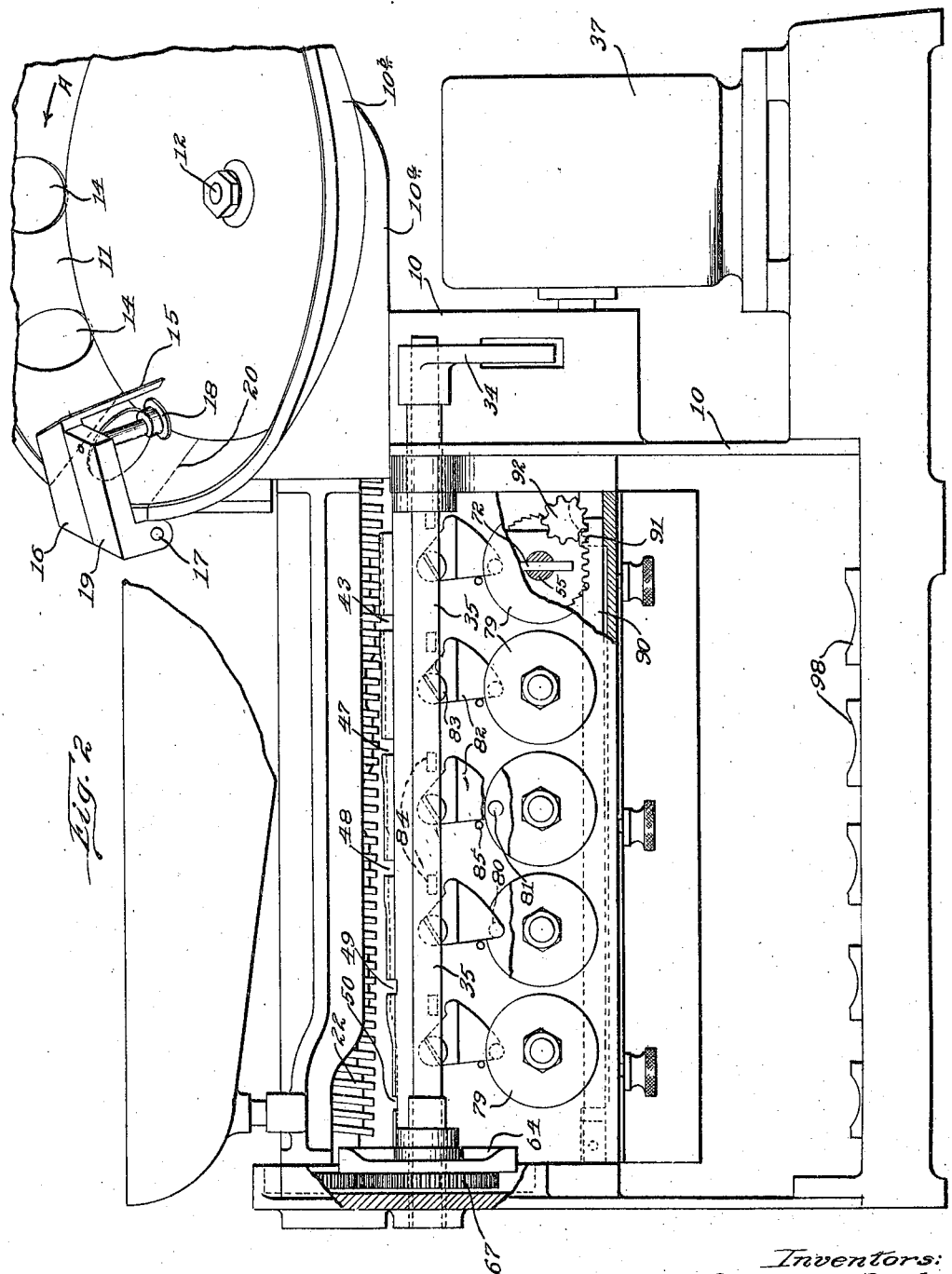

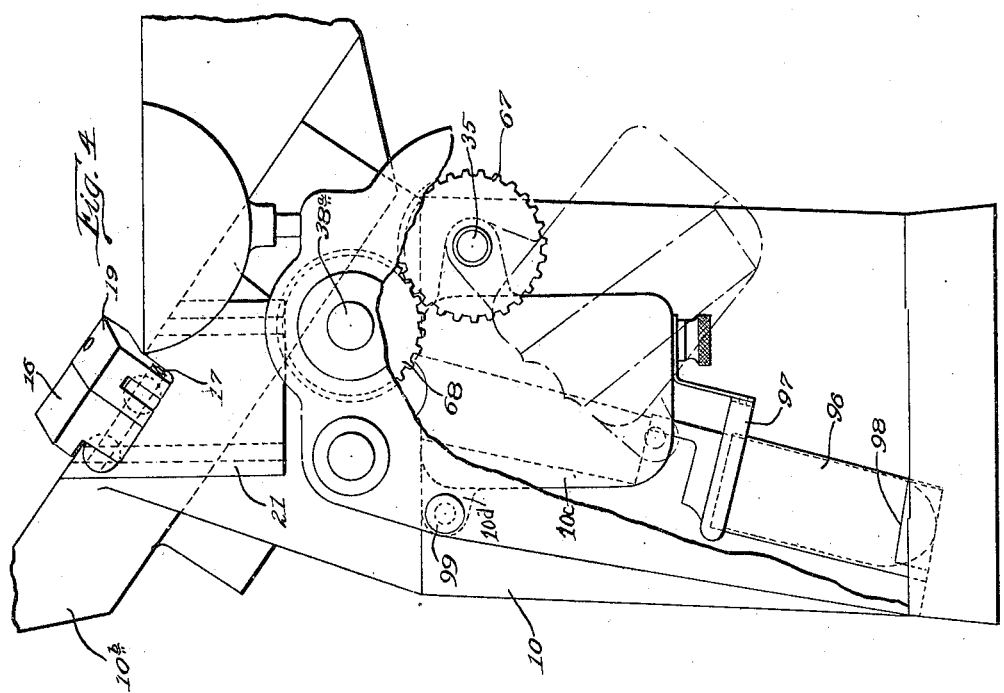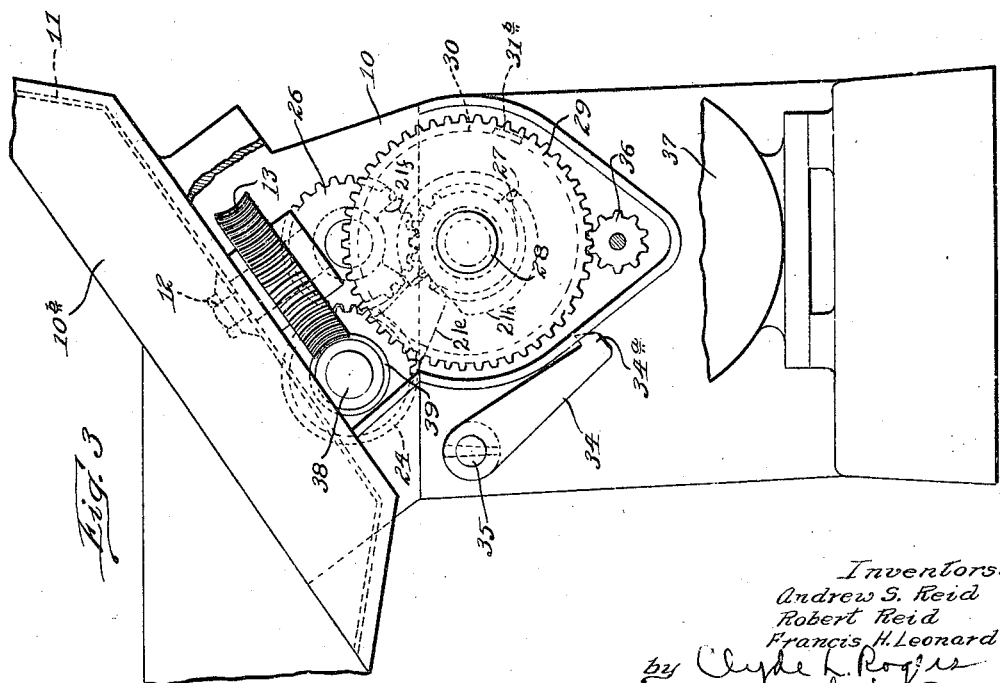

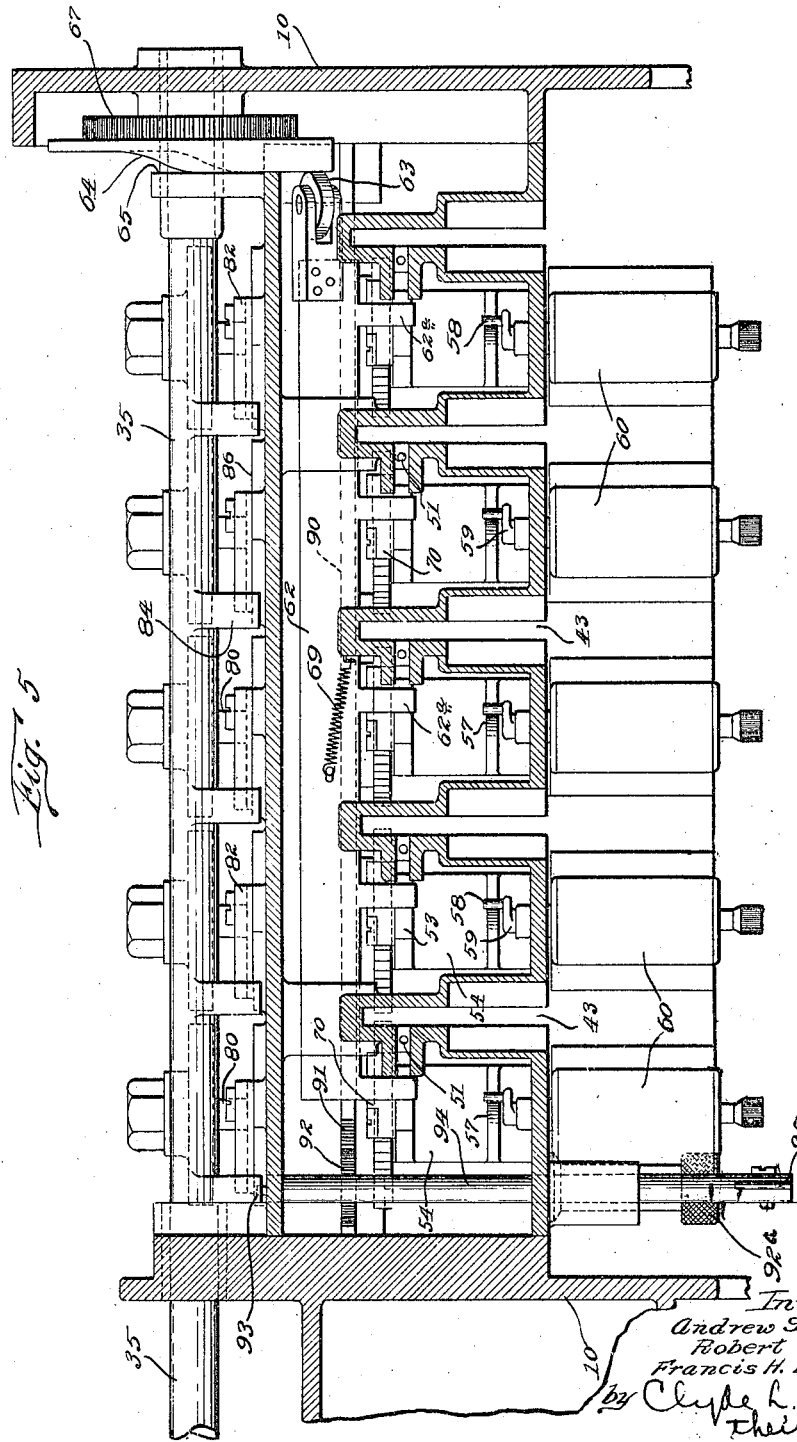

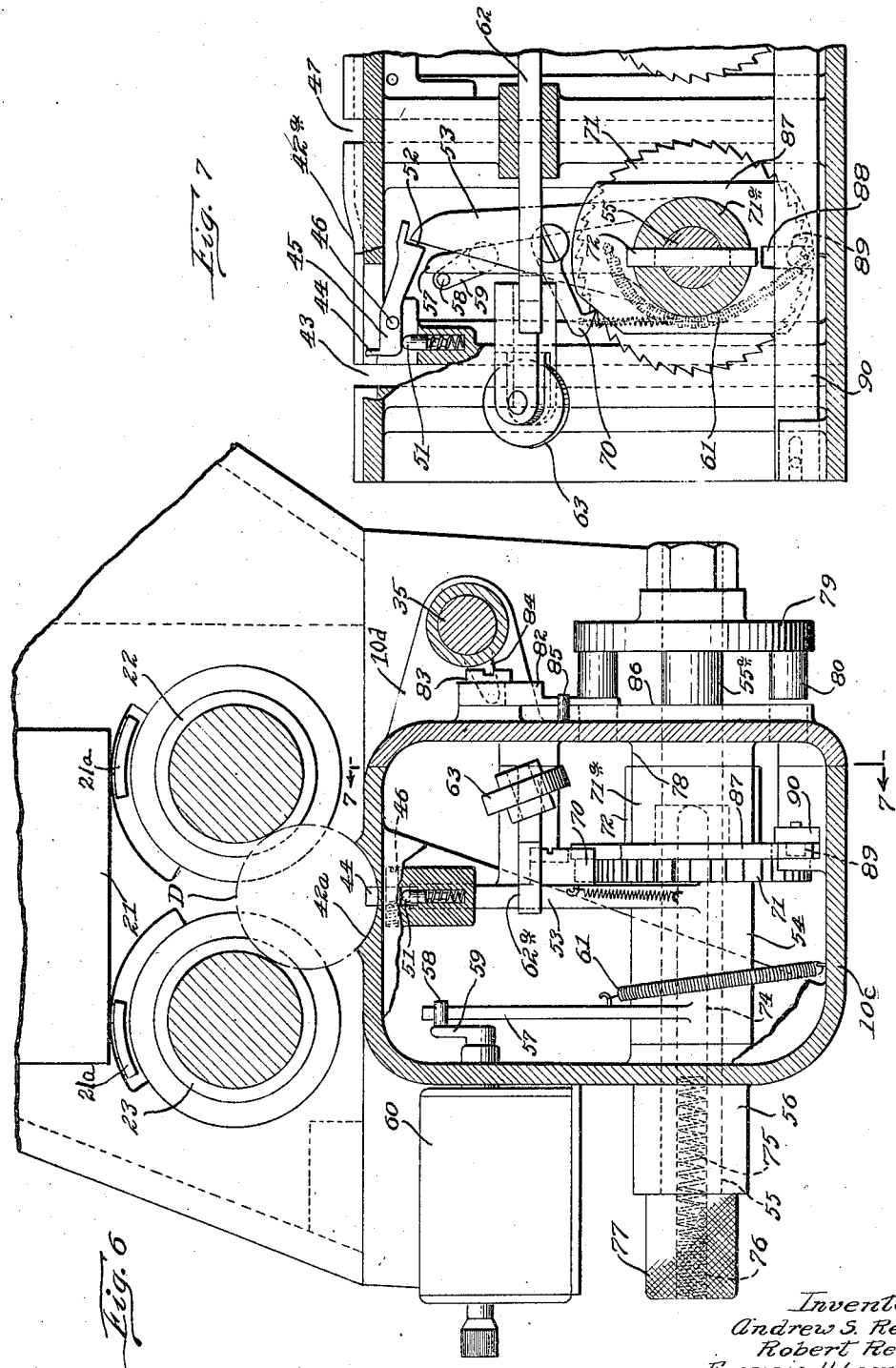

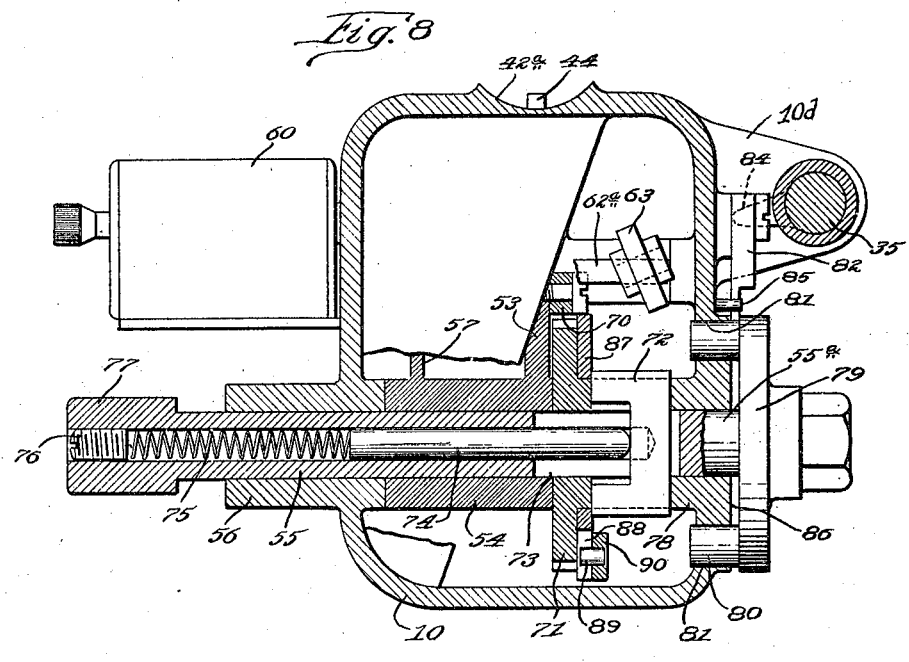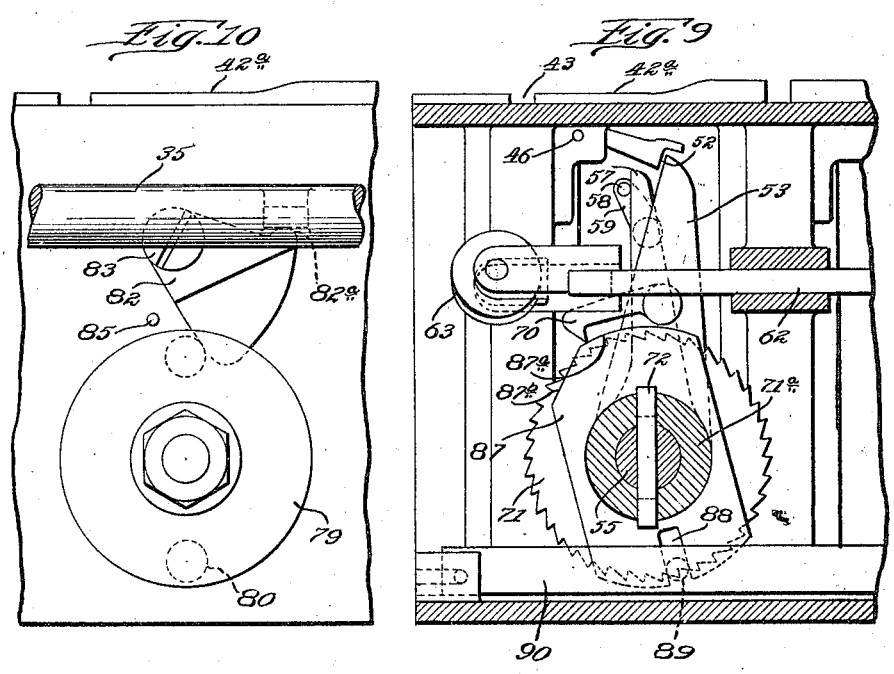

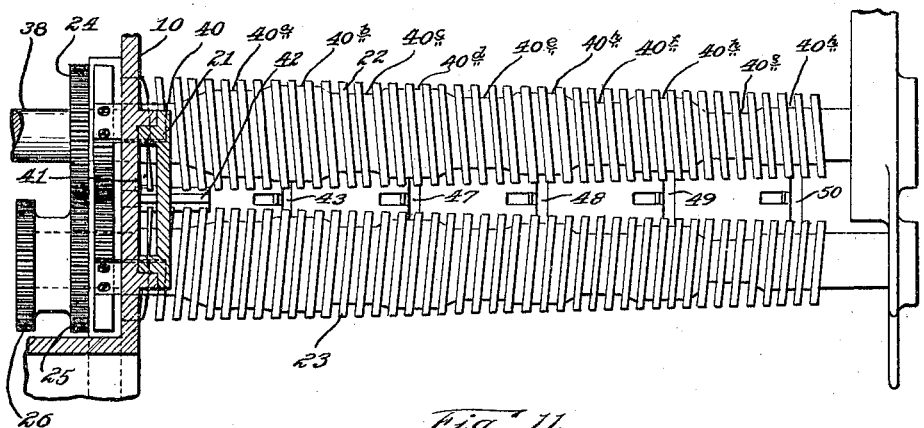
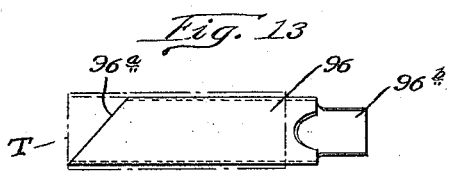
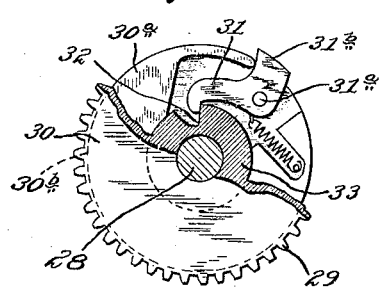
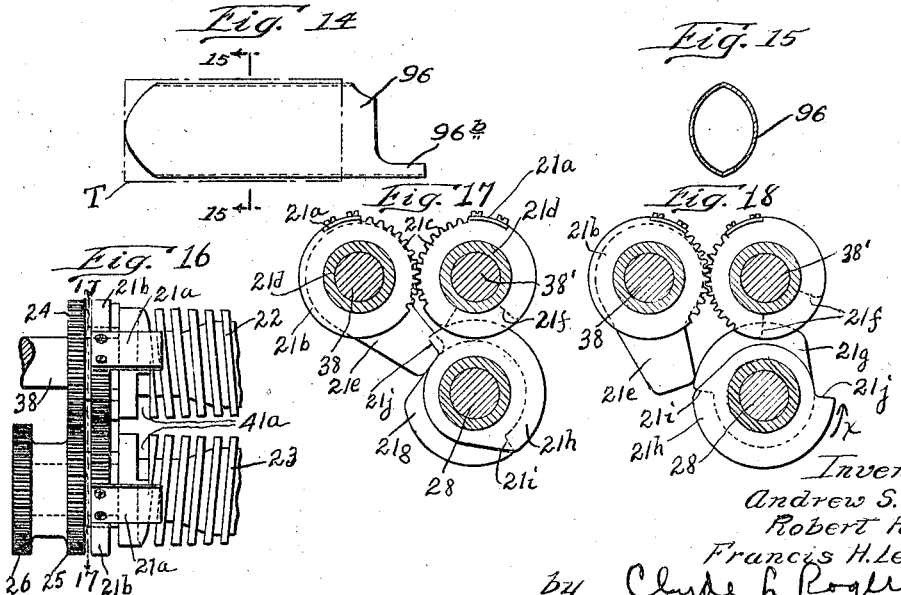

1,718,801

UNITED STATES PATENT OFFICE.

ROBERT REID AND ANDREW S. REID, OF BEVERLY, AND FRANCIS H. LEONARD, OF SALEM, MASSACHUSETTS, ASSIGNORS, BY MESNE ASSIGNMENTS, TO PNEUMATIC SCALE CORPORATION, LTD., OF NORFOLK DOWNS, MASSACHUSETTS, A CORPORATION OF MASSACHUSETTS.

COIN ASSORTING AND COUNTING MACHINE.

Application filed March 20, 1924. Serial No. 700,542.

This invention relates to mechanisms for assorting and counting coins, of a type that is operative automatically to segregate the coins of each denomination from a miscellaneous collection, and to count the coins of each denomination as they are selectively delivered. In its more comprehensive embodiment the invention also comprises improved means that may be rendered operative, or inoperative at will, for packaging the coins of each denomination, and for automatically stopping the machine when a predetermined number of coins of any denomination has been delivered to the packaging station for that particular coin. In certain aspects the invention is in the nature of an improvement and further development of the machine set forth and claimed in our prior application for patent Serial No. 552,743 filed April 14, 1922. The present invention comprises certain novel features and rearrangements of parts which will be more fully set forth in the following detailed description taken in connection with the accompanying drawings and the distinctive features of novelty will be thereafter pointed out in the appended claims.

Referring to the drawings:

Figure 1 is a front side view with portions broken away of a coin assorting, counting and packaging machine embodying the invention;

Figure 2 is a rear side view thereof with portions broken away and in vertical section;

Figure 3 is an end view looking from the left in Figure 1 with portions broken away;

Figure 4 is an end view looking from the right in Figure 1 with portions broken away;

Figure 5 is a partial horizontal section on line 5—5 of Figure 1;

Figure 6 is a partial vertical section on line 6—6 of Figure 1;

Figure 7 is a partial vertical section on line 7—7 of Figure 6;

Figure 8 is a partial vertical section approximately on the same plane as Figure 6, but showing the parts in different relative positions;

Figure 9 is a partial section similar to Figure 7, but showing a different adjustment of parts;

Figure 10 is a fragmentary side elevation looking from the right in Figure 8;

Figure 11 is a partial plan view of the parallel screws and certain co-related parts taken on line 11—11 of Fig. 1;

Figure 12 is a detail partly in elevation and partly in vertical section approximately on the line 12—12 of Figure 1;

Figure 13 is a plan view of one of the tubular containers into which the coins are delivered for packaging;

Figure 14 is a side view thereof;

Figure 15 is a transverse section on line 15—15 of Figure 14.

Figure 16 is a fragmentary plan view looking down upon the coin receiving ends of the screws and showing an escapement device for controlling the delivery of the coins to the screws;

Figure 17 is a transverse section on line 17—17 of Fig. 16; and

Figure 18 is a similar transverse section showing the parts in different relative positions from those of Figure 17.

10 indicates the housing framework of the machine having at one end a bracket extension 10$^a$ which bears an inclined holder 10$^b$ in which is fitted for rotation a pan or hopper 11, having as shown, a flat bottom and outwardly sloping side walls. This hopper is journalled in the holder on a stub shaft 12 and is rotatably driven by a worm wheel 13 fixed on said shaft by connections to be later described. The hopper 11 has the sloping side walls thereof formed with a multiplicity of circular recesses 14 spaced apart around the circumference thereof, of a dimension large enough to receive the largest coin for which the machine is intended e. g. half dollars. The hopper is connected for rotation in the direction indicated by the arrow A so that its descending side is inward of the machine. A plate strip or finger 15 is mounted on a holder block 16 pivoted at 17 adjacent this descending side of the hopper in position to press back and clear excess coins which may be carried to the upper portion of the hopper, and cause such an agitation of the coins as will insure that one thereof will be laid in each of the recesses 14 as they pass the locality of said finger. Just beyond the finger 15, a roller 18 is borne by a block 19 also mounted to turn on the pivot 17 and located so as to press by gravity lightly upon the coin resting in each recess 14 as it comes opposite thereto. The holder 10$^b$ is recessed opposite this roller 18 as indicated at 20 to permit the coins to drop therethrough, and a vertical chute 21 adapted to permit the coins to drop downward therein is borne by the housing with its upper receiving end at the locality of the recess 20. Thus the coins resting in the recesses 14 are adapted to drop therefrom through the recess 20, and into the chute 21 as they come opposite thereto, the roller 18 by its pressure on the coin insuring that it will thus be cleared and deposited in the chute. Means is provided for controlling the delivery of the coins downward from the chute 21 on to the assorting screws to be presently described, so that the rate of delivery of the coins is adapted to the capacity of the screws for taking care of the same. For this purpose we provide gate members shown as plates 21$^a$ borne by discs 21$^b$ and extending directly underneath the bottom of the chute 21, between the same, and the tops of the screws 22, 23 to be later described. The discs 21$^b$ are formed with intermeshing gear segments 21$^c$ whereby they are oscillated simultaneously to move the plates 21$^a$ alternately toward and away from each other with a spacing such that when moved apart a coin is permitted to drop downward between the plates, while when moved towards each other the coins are held back in the chute. These plates 21$^a$ thus constitute gate members of an escapement device for the coins to control the supply thereof to the screws. These discs 21$^b$ are fitted for free turning movement on sleeves 21$^d$ loosely mounted on shaft extensions 38, 38' of the screws. For oscillating the plates 21$^a$ one of the discs 21$^b$ is provided with a projecting arm 21$^e$, and the other one thereof is provided with an arcuate recess 21$^f$. Cam plate members 21$^g$, 21$^h$ are fixed side by side on a drive shaft 28 to be later described, the cam 21$^g$ being in the plane of the arm 21$^e$ and formed with a shoulder 21$^i$ adapted to engage said arm to oscillate the same, and with a raised portion following such shoulder to hold the arm 21$^e$ temporarily in the position to which it is thus oscillated, this movement acting to move the plates 21$^a$ towards each other. The other cam member 21$^h$ is in the plane of the arcuate recess 21$^f$ of the other disc 21$^b$, i. e. laterally offset with respect to the arm 21$^e$, and this cam member is provided with a shoulder 21$^j$ adapted to engage a wall of said recess 21$^f$ to swing the two discs 21$^b$ in a reverse direction, i. e. such as to move apart the plates 21$^a$ the movement of said cams for this purpose being in the direction of the arrow X. Thus the gate plates 21$^a$ are moved alternately toward and away from each other in synchronism with the rotation of the screws which are driven as now to be described from the shaft 28. A pair of specially formed screws 22, 23 of a generally conical contour and with relatively deep threads are mounted in the housing on parallel axes with their larger ends directly underneath the chute 21, with the chute so located as to discharge the coins between said screws. These screws are geared together for synchronous rotation by gears 24, 25 fixed on the respective shafts of said screws. One of these shafts, i. e. as shown the shaft of the screw 23 also has fixed thereon a gear 26 which transmits driving impulse to the screws from a gear 27. This gear 27 is mounted on a stub shaft 28 borne by the housing, which also bears a large gear 29 with an intermediate clutch device 30. This clutch device (Fig. 12) comprises two disc members 30$^a$, 30$^b$, the member 30$^a$ being fixed to the gear 27, and the member 30$^b$ being fixed to the gear 29. The member 30$^a$ has pivoted thereto at 31$^a$ a spring actuated dog 31 adapted to engage a ledge or shoulder 32 formed on one side of a recess in a hub portion 33 of the clutch member 30$^b$. The dog 31 has a tail portion 31$^b$ projecting outward from the clutch discs and adapted to be engaged by a beak 34 (Fig. 3) borne at the end of an arm 34, which is fixed on a rockshaft 35 journalled lengthwise of the housing, and the control of which is explained later herein. The clutch device 30 with its provision for control by the rockshaft 35 thus constitutes a stop motion device for disconnecting and stopping the movement of the screws 22, 23 whenever the beak 34$^a$ is moved to engage the tail piece of the dog 31, and draw it out of engagement with the shoulder 32 on the clutch member 30$^b$. The large gear 29 is in driven engagement with a pinion 36 on the shaft of an electric motor 37 mounted on the housing base, this typifying any suitable means for transmitting operative movement to the machine. The shaft on which the screw 22 is mounted has an extension 38 on which is fixed a worm 39 which meshes with the worm wheel 13 to turn the hopper 11, this typifying any suitable means for rotating the hopper continuously.

The screws 22, 23 are of opposite pitch and they are alined so that the threads and grooves of one are opposite the threads and grooves of the other respectively. Besides being tapering these screws are of special formation in that the cores thereof are of varying dimension at different portions of their length for a purpose to be now described. At the larger end of the screws and at the locality where the chute 21 delivers the coins thereto, the cores are relatively small in diameter as indicated at 40, (Fig. 11) i. e. so that all the coins which the machine is intended to handle are permitted to drop down between the threads of the screws as indicated at 41 to a point where the diametrical line of the largest coins is below the horizontal diametrical plane of the screws, this being to insure that all the coins will be properly located and caught between the threads of the screws to be advanced and controlled thereby.

These coin receiving ends of the screws have the extremities of the threads thereof formed with a non-spiral, or no pitch turn as indicated at $41^a$, this no pitch thread formation merging into the spiral thread convolutions in a cam edge $41^b$, and affording an extended interval for the dropping of the coins into place between the threads of the screws at the receiving end thereof. In the described movement the coins come to rest upon a rib or block 42 secured to the framework which presents an upwardly beveled top surface adapted as the coins are advanced endwise of the screws by the rotation thereof to raise the coins upward so that their diameters are above the diametrical plane of the screws. This rib 42 is relatively short and as the coins are borne beyond the end thereof, they are at the locality of a portion $40^a$ of the screw cores which is of a dimension to permit the smallest coins for which the machine is intended, e. g. dimes, to slip down below the cores, while holding all the other and larger dimensions of coins above the screws, but still engaged in the threads thereof. The coins then progress along the screws to relatively larger core portions $40^b$ which are large enough to prevent the dimes from again moving upward past the diametrical plane of the screws. In this forward movement of the coins, the dimes which are now below the diametrical plane of the screws as indicated at D in Figure 6, rest upon and slide along a concaved slideway $42^a$ provided therefor on the housing. At this locality the housing is equipped with a slot 43, through which the dimes are permitted to drop and pass to the packaging or bagging station to be later described. Just before dropping into the slot 43, the coin engages an upwardly projecting finger 44 located in the path thereof, and borne by an arm 45 which is pivoted at 46 in the housing, to swing said arm and cooperate in the control of the counting and stop motion devices to be presently described. The remaining larger dimension coins next progress to a locality of the screws having relatively reduced core portions $40^c$, which are made small enough to permit the next larger dimension of coins, e. g. cents, to drop downward past the diametrical line of the screws but large enough to prevent the other coins from so dropping. The cents thus located below the screws slide along a continuation of the slideway $42^a$ and are held from displacement or again rising by enlarged portions $40^d$ of the cores. At the locality of these enlarged portions, a slot 47 is provided in the housing for the cents to drop downward therethrough. The screws are provided with alternating successively reduced portions $40^e$, $40^f$, and $40^g$ for the nickels, quarters and half dollars to drop downward and with intermediate enlarged portions $40^h$ to prevent the coins from again rising in like manner as already described, and slots 48, 49, 50 are provided at the locality of these enlarged portions of the cores to permit the nickels, quarters and half dollars respectively to drop downward to their respective destinations.

It is to be understood that there is a finger 44 located just in advance of each of the slots 47, 48, 49 and 50 to be tripped by the coins of the respective denominations just before they drop into the slot provided therefor, and each of these fingers 44 is associated with and adapted to control a counting and stop motion device, there being thus one of these counting and stopping motion devices for each denomination of coin. All of these counting and stop motion devices being alike a description of one thereof will be sufficient for all. The pivoted arm 45 is acted on by a spring pressed pin 51, so that it is normally held yieldingly and lightly in position to present the finger 44 in the path of the coins of the particular denomination, which are sliding along that portion of the slideway $42^a$. In this position of the arm 45, a ledge or shoulder 52 thereon is in position to engage behind the extremity of an arm 53, which is borne by a hub 54, which is journalled to turn on a tubular member 55 that is itself slidingly mounted in a boss 56 of the housing. The hub 54 also bears an arm 57, the outer end of which engages a pin 58 borne by the arm 59 of a counter device 60, which may be of usual type and which is actuated to register the count by the swinging movement imparted to the arm 59 by the rocking of the arm 57. The arms 57 and 53 are acted on by a tension coil spring 61, having one end engaged therewith and its other end anchored to the housing, to thus actuate the counter when the shoulder 52 of the arm 45 is tripped by a coin to permit this movement. For returning the arm 53 after such movement to reset it behind the shoulder 52, a bar 62 extending substantially the length of the machine and thus co-operative with all the counter devices is mounted for reciprocation in the housing, and is equipped with lateral projections $62^a$ co-operative with the respective arms 53 of the several counter devices to swng them in a clockwise direction as seen in Figure 7 against the tension of the spring 61. The bar 62 (Fig. 5) is actuated by the engagement of a roller 63 borne at the end thereof, with a face cam 64 which is mounted on a sleeve 65 loosely fitted on the rockshaft 35 already described. This cam 64 has rigid therewith a gear 67 with which meshes a gear 68 fixed on a shaft extension $38^a$ of the screw 22.

The roller 63 is held constantly engaged with the cam 64 by a tension spring 69 engaged therewith, and having its other end anchored to the housing. The bar 62 is thus constantly reciprocated, and as soon as the arm 53 is rocked as described after tripping of the arm 45, it is at once restored to initial position by the engagement of the finger or projection 62ª behind the same. The cam 64 is so proportioned, that on the return movement imparted to the arm 53 it is moved slightly farther than required to permit the shoulder 52 to drop in front of the same as indicated in Figure 7, and it is held in this position by the cam while the arm 45 is being tripped by the coin, thus freeing the arm 45 from the frictional engagement of the arm 53, and permitting it to move easily by the engagement of the coin with the projection 44. While the arm 45 is tripped by the coin, a low portion of the cam 64 permits the arm 53 to swing, bearing with it the arm 59 for the counting movement.

The invention also embodies means whereby the machine may be stopped automatically after a predetermined number of coins of any given denomination have been delivered, this feature of the invention being particularly applicable to packaging coins in packs of a required number. For this purpose the arm 53 bears a pivoted pawl 70 adapted to engage the teeth of a ratchet wheel 71. This ratchet wheel is loosely journalled on an inner portion of the tubular member 55 and has a hub portion 71ª diametrically slotted to receive a transverse key 72, which also passes through an elongated slot 73 of the tubular member 55 to thus cause said tubular member to rotate with the wheel 71, and be capable also of endwise sliding movement therethrough. The tubular member 55 has slidingly fitted in the bore thereof, a pin 74 one end of which engages the key 72, while its other end is engaged by a compression coil spring 75 housed in the outer portion of said bore, this spring reacting against a screw 76 set into a head 77 at the outer projecting end portion of said tubular member. The other end portion 55ª of the member 55 is fitted in a boss 78 of the housing, and its outer projecting extremity has fixed thereon a head 79 which bears one or more inwardly projecting short pins 80, which are adapted to engage in holes 81 provided therefor in the housing. The units provided for the coins of smaller denomination preferably have only one of these pins 80, so that the ratchet wheel 71 is permitted a full rotation before the stop device as now to be described operates. In the case of coins of larger denomination, such as half dollars, there are preferably provided two of these pins 80 oppositely disposed on the head 79, so that the stop mechanism will operate when the ratchet wheel has made only half a rotation. It will be noted that the action of the spring 75 thus tends to draw the member 55 endwise and cause the pins 80 to enter the holes provided therefor whenever they are in register with such holes. A plate member 82 (Fig. 10) is swingingly pivoted to the housing at 83 in position to normally swing downward by gravity, so as to cover the upper one of the holes 81, and being also located so that it is engaged by the pin 80 to be swung upward. This plate member is equipped with a hump or projection 82ª which is adapted to engage a prong or finger 84 (Figs. 2 and 8) fixed to, and extending from, the shaft 35. It will be understood that this shaft 35 extends substantially the length of the machine for co-operation with all of the units of the counter and stop mechanism for the several coin denominations, and that it is provided with a series of fingers 84 co-operative with each of these units. It may now be understood that in starting the machine, all of the heads 77 are pressed inward so that the pins 80 are pressed out of the holes 81 and the plates 82 swing downward by gravity as far as permitted by stop pins 85 and so as to cover said holes. The action of the spring 75 at this time holds the ends of the pins 80 against the plates 82. Then as the delivery of the coins progresses, the pawls 70 advance their respective ratchet wheels 71 and thus turning the head 79 so that the pins 80 first ride off of the plates 82, and then continue to bear upon the plane surface of the housing indicated at 86 until the predetermined number of coins has passed through one of the units, whereupon a pin 80 of that unit engages the plate 82 and swings it upward until the hump 82ª thereon engages the prong 84 and rocks the shaft 35. This causes the pawl 34ª borne by the arm 34, to engage the tail 31ᵇ of the pawl 31 and thus disconnect the clutch and stop the machine. As this occurs the pin 80 again comes into register with the hole 81 and slips thereinto, thus locking the ratchet wheel 71 against further movement. The described stop mechanism is of particular use and advantage where the coins are to be packaged in predetermined numbers. Where it is desired merely to bag the coins without packaging them in definite numbers, means is provided for disabling this stop device. For this purpose a shield plate (Fig. 9) 87 is mounted to turn upon the hub 71ª, this plate being provided with an outwardly extending portion 87ª adapted to hold the pawl 70 out of engagement with the ratchet wheel 71, and having also a beveled and reduced portion 87ᵇ which when turned to the locality of the pawl, permits the pawl to engage said ratchet wheel. For rocking the shield plate 87 so as to position it either for disabling the pawl 70 or permitting it to become active at will, it is provided with a radial slot 88, which is engaged by a pin 89 borne by a bar 90 mounted for sliding movement in the housing. This bar which has pins 89 co-operative with all of the counter units, is equipped at one end portion thereof with a rack 91, (Fig. 2) which is engaged by a pinion 92, mounted on a transverse shaft, and having a hand wheel 92ª (Fig. 1) for actuation thereof. For stopping the machine manually when desired, an additional one of the prongs 84 (Fig. 5) borne by the shaft 35 is engaged by an eccentric pin 93, which is borne by a shaft 94 journalled in, and extending transversely of the housing, and equipped with a handle 95 at the front of the machine. Thus by turning this handle, the shaft 35 is rocked to swing the pawl arm 34 and actuate the stop motion device 30 as already described.

Tubular receivers 96 (Fig. 4) are provided for receiving the coins of each denomination as they are discharged through their respective slots 43. These receivers are generally elliptical in cross section i. e. flattened widthwise, as indicated in Figure 15 and they have their outer ends beveled transversely as indicated at 96ª, with projecting lips 96ᵇ on their under sides at their inner ends to extend up into the respective passages 43. These receivers are mounted in oblique or inclined position in the machine, with their upper end portions yieldingly engaged by spring clips 97, and their lower ends received in sockets 98 provided at the base of the framework. These receivers are adapted to have paper or like cartridge tubes T slipped thereover to receive the coins and constituting packages therefor. By reason of the oblique disposition of the receivers 96, and the flattened cross section thereof, the coins are caused to lie in a slanting or oblique piled arrangement in the receivers, the purpose of this being so that when the coins slide out of the outer ends of the receivers into the paper cartridge tubes, and are righted therein, they will fully fill out the walls of such tubes and be closely packed therein.

In the handling of coins for assorting and packaging as described, a quantity of lint and other foreign matter and débris clinging to the coins, gradually accumulates in the mechanism, and it is important that means be provided for clearing out this foreign matter without dimantling or disassembling the machine. For this purpose the several counting and stop motion units are all mounted and contained complete in a casing formation 10ᶜ (Fig. 4) of the housing framework. This casing formation is held at one side by lugs 10ᵈ to turn upon the shaft 35, which is fitted through apertures of these lugs. At its other side this casing is supported and held in operative position by a pin 99 slidably fitted in the housing, and which engages in the aperture of a lug 100 (Fig. 1) formed in this casing 10ᶜ. Thus by drawing out this pin 99 which may have a projecting knurled head for this purpose, the casing 10ᶜ is permitted to swing downward making the coin slideway 42ª, and the several coin-receiving slots 43 conveniently accessible for clearing out of such lint or the like as may have accumulated therein. We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having described our invention, what we claim as new and desire to secure by Letters Patent is:

1. A coin-assorting machine, comprising two tapering screws mounted side by side and connected for synchronous rotation, counter units for coins of the respective denominations having operative elements located at intervals along the length of said screws in position to be actuated by the coins moved thereby, with coin-delivering chutes for the respective denominations located in proximity to each of said elements, said screws having cores of a generally tapering dimension, but with intervening relatively enlarged portions at the locality of said counter operating elements adapted to hold the coins that have passed through the screws against return movement and in position to actuate said counter-operating elements.

2. In a coin-assorting mechanism a screw adapted to receive the edges of the coins between the threads thereof, and having a core of generally tapering dimensions from end to end thereof, but with intermediate relatively enlarged portions for the purpose stated.

3. The combination of coin sorting mechanism comprising two screws mounted side by side to provide a diverging space between them through which coins of different sizes may pass at different points along the length thereof, with counter units for different sizes of coins arranged at different points along the length of the screws, said screws having provision for holding the coins which have passed through said space, against return movement and for causing the coins to initiate the operation of their counter units.

In testimony whereof, we have signed our names to this specification.

ROBERT REID.
ANDREW S. REID.
FRANCIS H. LEONARD.